(12) United States Patent
Greenwell

(10) Patent No.: US 7,059,419 B2
(45) Date of Patent: Jun. 13, 2006

(54) TRACTOR HITCH LIFT ARM ADAPTOR

(76) Inventor: Owen Patrick Greenwell, 487 D.E. Brown Rd., Brandenburg, KY (US) 40108

( * ) Notice: Subject to any disclaimer, the term of this patent is extended or adjusted under 35 U.S.C. 154(b) by 0 days.

(21) Appl. No.: 10/831,766

(22) Filed: Apr. 24, 2004

(65) Prior Publication Data
US 2005/0072582 A1 Apr. 7, 2005

Related U.S. Application Data

(60) Provisional application No. 60/466,025, filed on Apr. 25, 2003.

(51) Int. Cl.
| | |
|---|---|
| A01B 51/00 | (2006.01) |
| A01B 59/00 | (2006.01) |
| B62C 7/00 | (2006.01) |
| B62C 11/00 | (2006.01) |

(52) U.S. Cl. ................ 172/272; 172/677; 280/477; 280/510; 280/186

(58) Field of Classification Search ............... 172/272, 172/439–445, 446–451, 677–681, 683, 684.5, 172/705–711, 734, 748; 280/455.1–466, 280/476.1–489, 504–515, 186
See application file for complete search history.

(56) References Cited

U.S. PATENT DOCUMENTS

| | | | |
|---|---|---|---|
| 2,295,021 A | 9/1942 | Weiss | |
| 3,489,431 A | 1/1970 | McKeon et al. | 280/478 |
| 3,791,456 A | 2/1974 | Koch | 172/450 |
| 3,977,698 A | 8/1976 | von Allworden | 172/272 X |
| 4,146,246 A | 3/1979 | Geisthoff | 172/275 X |
| 4,157,838 A | 6/1979 | von Allworden | 280/508 |
| 4,241,935 A | 12/1980 | Vollmer et al. | 172/272 X |
| 4,773,666 A | 9/1988 | Koberlein et al. | 172/443 X |
| 4,944,354 A | 7/1990 | Langen et al. | 172/272 X |
| 5,050,684 A | 9/1991 | Vollmer | 172/272 |
| 5,129,667 A | 7/1992 | Gratton | 280/493 |
| 5,303,790 A | 4/1994 | Coleman | 180/53.3 |
| 5,441,117 A | 8/1995 | Fartmann et al. | 172/272 |
| 5,497,835 A | 3/1996 | Laubner et al. | 172/272 |
| 5,544,708 A | 8/1996 | Braun | 172/272 |
| 5,713,691 A | 2/1998 | Solberg | 403/322 |

*Primary Examiner*—Christopher J. Novosad
(74) *Attorney, Agent, or Firm*—David W. Carrithers; Carrithers Law Office, PLLC

(57) ABSTRACT

An adapter that converts a tractor hitch coupling from a ball and pin type to a hook type. The adapter is a tubular member having an opening at one end into which an end of the hitch arm is inserted and a hook extends therefrom at the opposite end. A locking dog is movably mounted on the tubular member for selectively blocking the entry or throat of the hook and a spring biases the locking dog to it's locking state. Each of a pair of spaced apart side walls have at least one set screw threaded there through. The set screws engage opposite side faces of the lift arm on which the adapter is mounted permitting variously adjusting alignment of the adapter relative to the hitch lift arm on which it is mounted.

19 Claims, 4 Drawing Sheets

TRACTOR HITCH LIFT ARM ADAPTOR

This application claims priority from U.S. Provisional Patent Application Ser. No. 60/466,025 filed on Apr. 25, 2003.

TECHNICAL FIELD

This invention relates generally to tractor hitches and more particularly to an adapter for the hitch lift arms which converts the same from a standard ball to a hook implement connecting system.

BACKGROUND OF THE INVENTION

Two and three point tractor hitches are well know in which the lower pair of lift arms, in many cases, have a ball type coupling means adjacent the free outer ends thereof. Implements that are to be connected to these arms have a spaced apart pair of lugs that project into a hole in each of respective ones of the balls. Positioning of the tractor hitch relative to the implement must be relative precise in order to couple the implement to the hitch. The implement may for example be a grader blade, a disc mower, a post hole auger or any one of a number of different implements. These are heavy pieces of equipment and therefor not readily moved thereby dictating moving the tractor to precisely position the hitch relative to the implement. Doing this by one's self can often require getting on and off the tractor many times and subject the user to unnecessary inconvenience.

Using hooks extending from the lift arm rather than ball and socket arrangement having holes for the lugs, simplifies connecting the lift arms to the implement but unfortunately many of the known tractor hitches are of the conventional ball type. An object of the present invention therefore is to provide an adapter that converts the lift arm from a ball type to a hook type coupling means. The adapter of the present invention not only quickly and easily converts the ball type connecting means to a hook type coupling means but also has provision for adjustably aligning the adapter relative to the lift arm on which it is mounted.

Hook type connections for hitches are well known and many varieties thereof are exemplified by the teachings of the following United States patents: U.S. Pat. No. 5,713,691 granted Feb. 3, 1998 to G. Solberg; U.S. Pat. No. 5,497,835 granted Mar. 12, 1996 to J. Laubner et al; U.S. Pat. No. 5,441,117 granted Aug. 15, 1995 to N. Fartmann et al; U.S. Pat. No. 5,303,790 granted Apr. 19, 1994 to L. Coleman; U.S. Pat. No. 5,129,667 granted Jul. 14, 1992 to R. Gratton; U.S. Pat. No. 5,050,684 granted Sep. 24, 1991 to J. Vollmer; U.S. Pat. No. 4,241,935 granted Dec. 30, 1980 to J. Vollmer; U.S. Pat. No. 4,944,354 granted Jul. 31, 1990 to H. Langen et al; U.S. Pat. No. 4,773,666 granted Sep. 27, 1988 to R. Koberlein et al; U.S. Pat. No. 4,157,838 granted Jun. 12, 1979 to W. von Allworden; U.S. Pat. No. 4,146,246 granted Mar. 27, 1979 to H. Geisthoff; U.S. Pat. No. 3,977,698 granted Aug. 31, 1976 to W. von Allworden; U.S. Pat. No. 3,791,456 granted Feb. 12, 1974 to J. Koch; U.S. Pat. No. 3,489,431 granted Jan. 13, 1970 to C. McKeon et al; and U.S. Pat. No. 2,295,021 granted Sep. 8, 1942 to D. Weiss.

The foregoing patents disclose variously constructed hitch hook couplings that normally include an upwardly facing open mouth hook and a spring loaded latch for releasibly holding a member captive in the bite of the hook.

U.S. Pat. No. 5,544,708 granted Aug. 13, 1996 discloses a pair of hook members interconnected by a spreader bar and each have an open channel for receiving respective ones of the pair of tractor hitch lift arms. The spreader bar has pins of reduced size that pass through aligned holes in the lift arms and a channel member (or box section) that projects from the hook member. The spreader bar is adjustable in length and spaces the lift arms a preselected distance from one another. Securement pins retain the lift arms on the spreader bar pins. FIG. 6 illustrates an embodiment wherein a pin is fixedly secured to the channel member alleviating the need for a spreader bar and it is contemplated that separate pins could also be used with the embodiment illustrated in FIG. 7 thereby avoiding the use of the spreader bar.

One of the drawbacks of the foregoing embodiments of the '708 patent is that the mounting channel, or box section as the case maybe, is offset from the implement connecting hook portion thus not only complicating the construction but also reducing the strength thereof. Also the channel as well as the box mounting portion is such that the assembly follows the path and is an extension of the diverging arms with the result the hooks would be spaced from the structure of the machine on which the pegs are mounted and projecting. The structure has no means of adjustably positioning the hook assembly relative to the hitch lift arm on which it is mounted.

SUMMARY OF THE INVENTION

A principal object of the present invention is to provide an adapter that makes it easy to change a tractor hitch system from a ball and lug implement coupling to a hook and lug/pin coupling.

A further principal object of the present invention is to provide an adapter for the foregoing purpose that incorporates means thereon for selectively adjusting alignment of the adapter relative to the hitch arm on which it is mounted.

In keeping with the foregoing there is provided in accordance with the present invention an adapter for a tractor hitch arm having a hole there through adjacent a free outer end thereof. The hitch arm adapter comprises a tubular member defined by a spaced apart pair of opposite side walls, a top wall and a bottom wall. The tubular member has a cavity for receiving therein a free outer end portion of the tractor hitch lift arm. The tubular member includes at least one opening into the cavity at one end of the tubular member and a hook at the opposite end. The member includes a hole through each of the side wall which are axially aligned for receiving a hitch arm. At least one set screw is disposed in each of the side walls and extends there through to engage a side face of a hitch lift arm projecting into the cavity.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
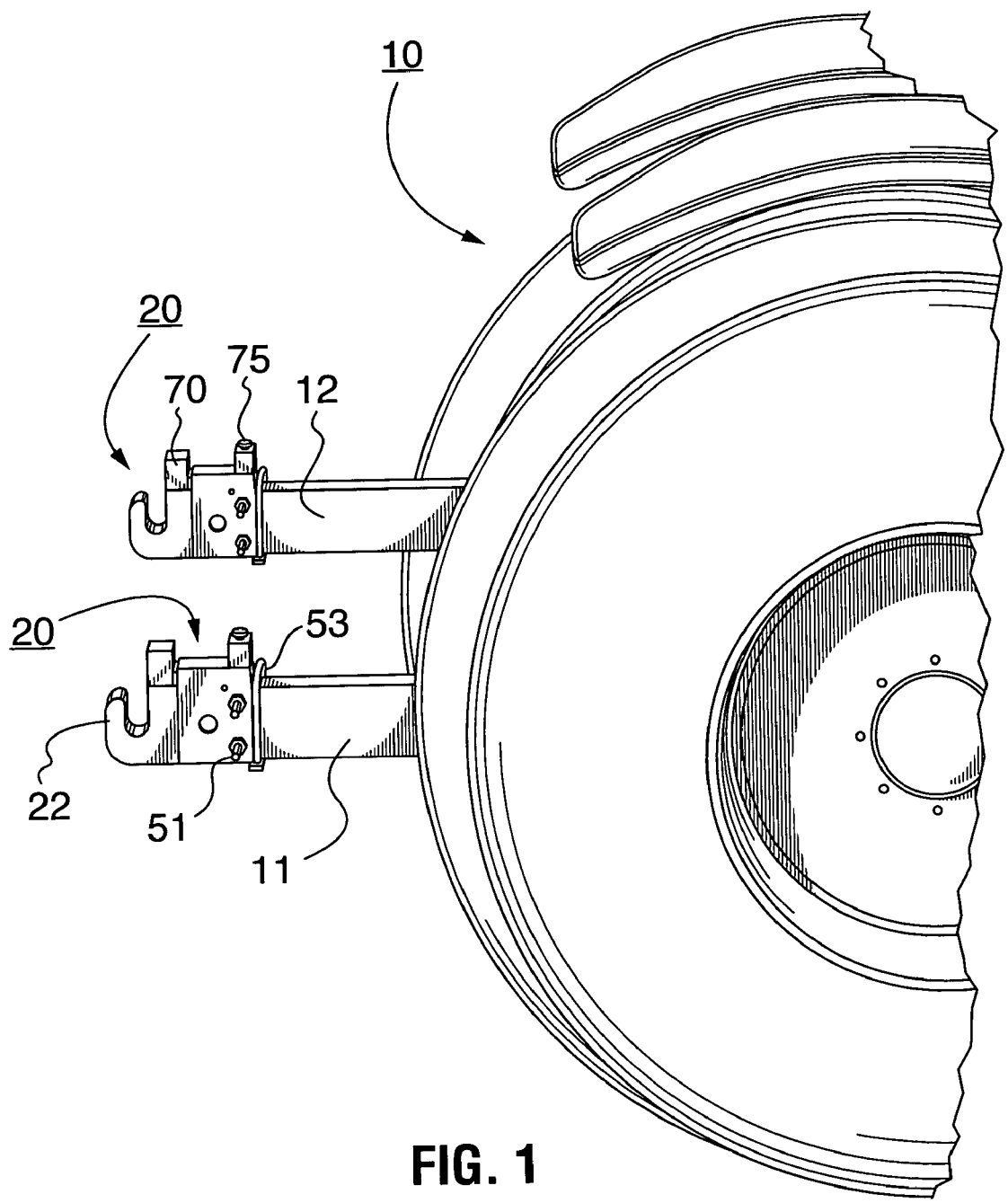
FIG. 1 is a side view of the rear end portion of a tractor having a lower pair of hitch arms extending rearwardly therefrom with each having an adapter thereon, provided in accordance with the present invention, that converts the arms from a ball to a hook type implement coupling means.
Figure 2:
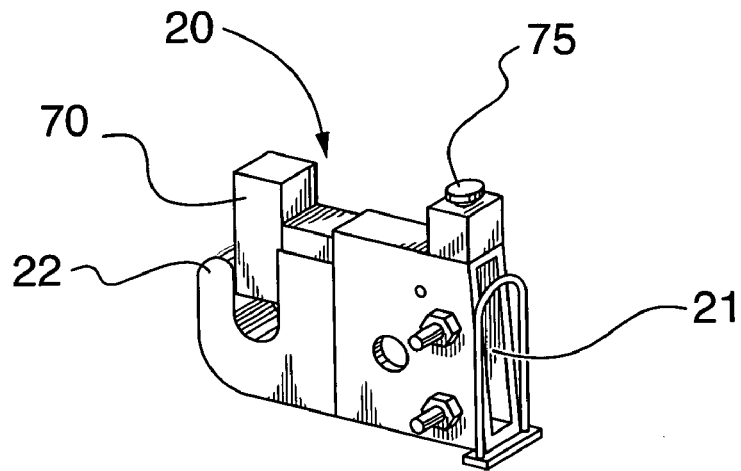
FIG. 2 is an oblique view of a preferred hitch adapter.
Figure 3:
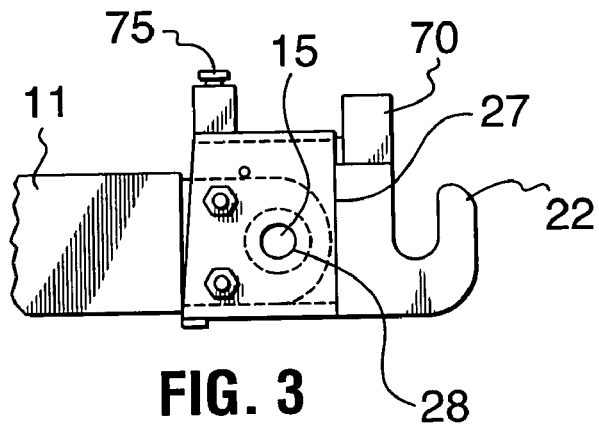
FIG. 3 is a side view of the adapter of FIG. 2 taken from the opposite side from that shown in FIG. 2.
Figure 5:
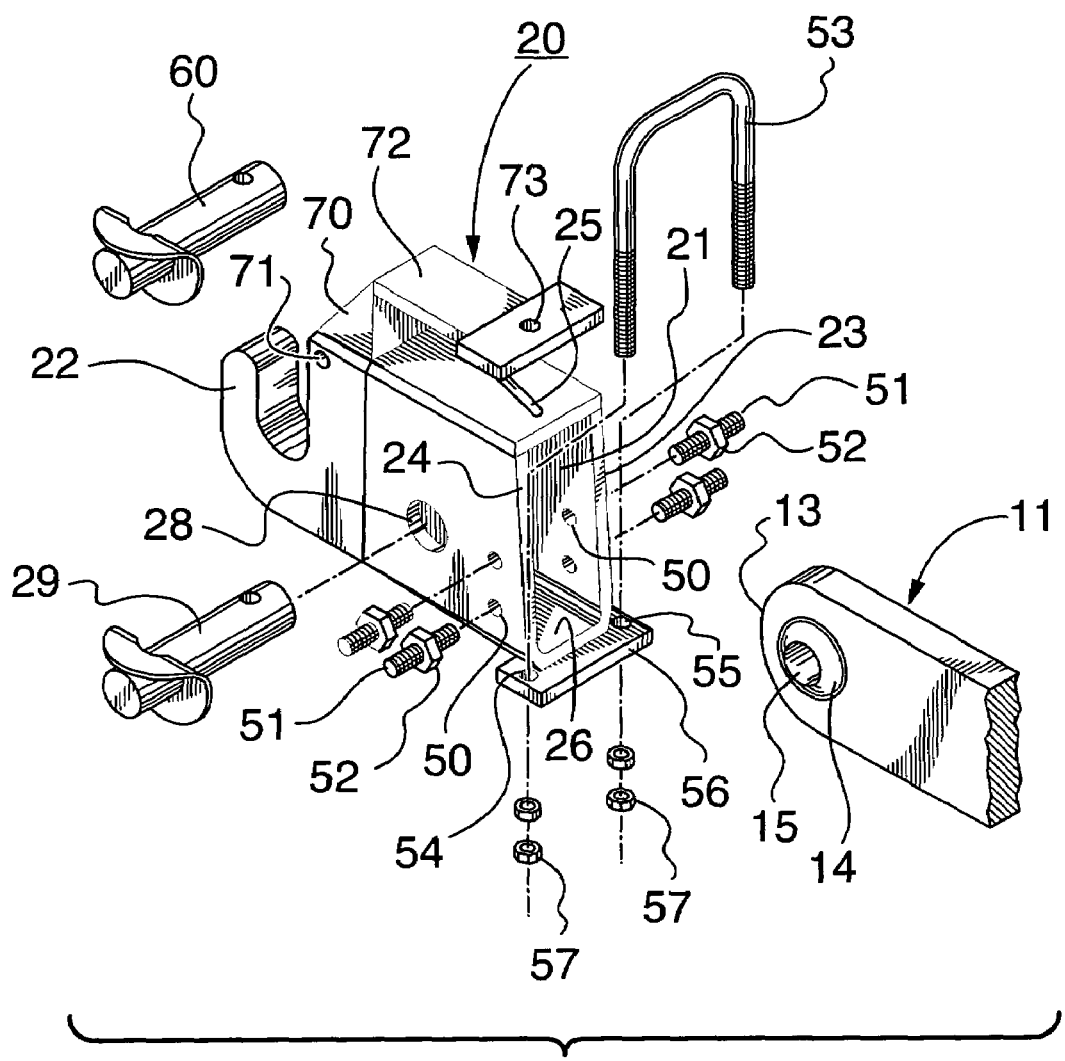
FIG. 5 is an exploded oblique view of a second embodiment of the hitch arm adapter provided in accordance with the present invention.
Figure 8:
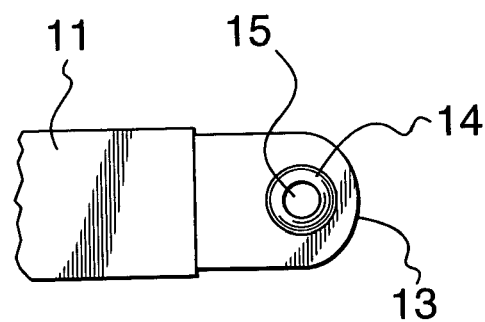
FIG. 8 is a side elevational view of an end portion of the tractor hitch lift arm without an adapter.

Shown in FIG. 1 is the rear end portion of a tractor 10 having a pair of conventional hitch lift arms 11 and 12 projecting rearwardly therefrom. Each arm terminates in a free outer end 13 and has a ball 14 spaced a selected distance from the free outer end of the arm as best shown FIGS. 5, 8, and 9. The ball 14 has a hole 15 for receiving a lug on an implement that is to be coupled to the tractor hitch. Mounted on each arm is an adapter 20, provided in accordance with the present invention, converting the hitch from a ball to a hook type coupling system.

The adapter 20 includes a rectangular in cross-section rigid sleeve member having a cavity 21 of selected depth with an opening there into at one end of the member and a hook 22 projecting from the opposite end. The sleeve member has opposed side walls 23, 24, and respective top and bottom walls 25, 26. The cavity has an inner end 27 which maybe open or closed by an end wall. The cavity telescopically receives therein a free outer end portion of the lift arm. There is an aperture 28 in each of the side walls 23, 24 that are axially aligned to receive therein a connecting pin 29. The lift arm terminal end 13 is disposed adjacent to or in close abutting relation with the end wall 27 when the pin 29 is inserted through the aligned apertures 28 and the hole 15 through the ball.

The walls 25, 26 are spaced to receive therein a lift arm having a selected heigh dimension and for arms that are less than that dimension in height a spacer 30 is provided. Spacers of various sizes can be provided to accommodate hitch lift arms of various heights. Some conventional lift arms vary in dimensions. For instance, some are typically about 4 inches in height while others may be 3.25 inches. The spacer is held in place by suitable means such as a pin 31 that projects from the spacer and through an aperture in the bottom wall 26 of the rigid sleeve member.

Figure 9:
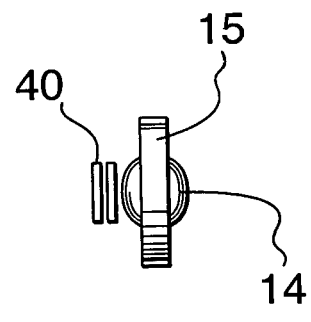
FIG. 9 is an end elevational view of the hitch lift arm shown in FIG. 8 with optional fillers for balls narrower in width than the width of a cavity into which it is inserted in the adapter.

The ball 14 on the lift arm projects from the opposite side faces of the arm and the spacing between the side walls 23, 24 is such as to receive the ball there between. As illustrated in FIG. 9, one or more washers 40 can be inserted if necessary to fill any gap that maybe present for the installation at hand. Each of the walls 23 and 24 have one or more threaded apertures 50 (two being shown in the drawings) threadingly receiving therein a set screw 51 that has a jam nut 52 threaded thereon. The set screws permit adjustably varying alignment of the adapter 20 and lift arm on which it is mounted and also assists in preventing it from moving relative thereto. The set screws provide a securing and an alignment means. Further securement of the adapter on the lift arm associated therewith is provided by a U-bolt 53 that straddles the lift arm and passes through a spaced apart pair of apertures 54, 55 in a plate 56 that is secured to the bottom wall 26. Nuts 57 thread onto the ends of the legs of the U-bolt and final securement of the adapter is done by tightening the nuts.

Figure 4:
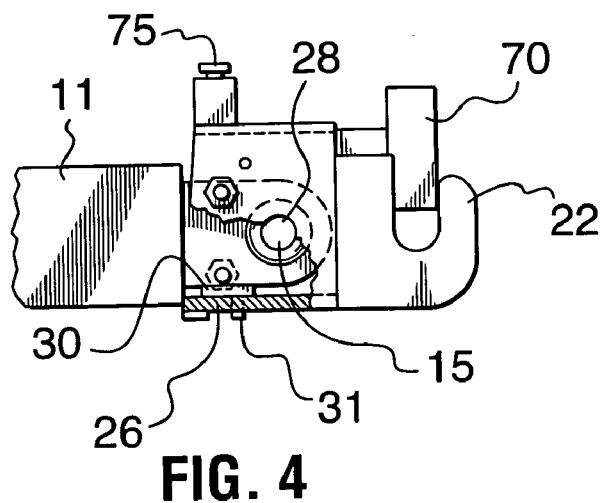
FIG. 4 is a side view of the adapter of FIG. 2 taken from the opposite side from that shown in FIG. 2 with the latch in a locking position.
Figure 6:
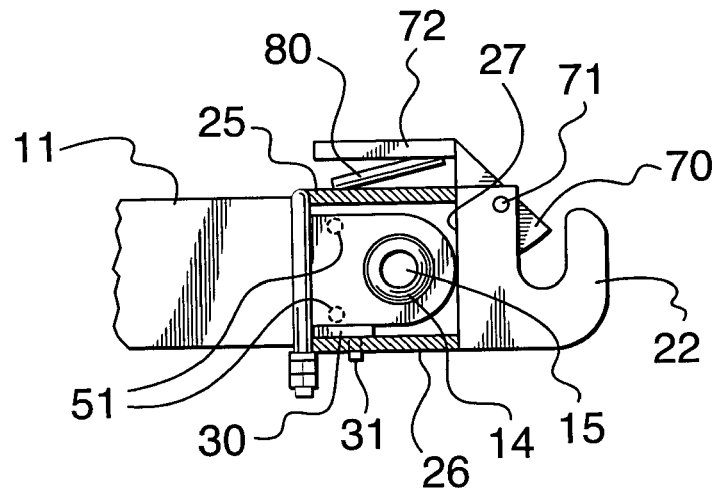
FIG. 6 is a side view of the adapter of FIG. 5.
Figure 7:
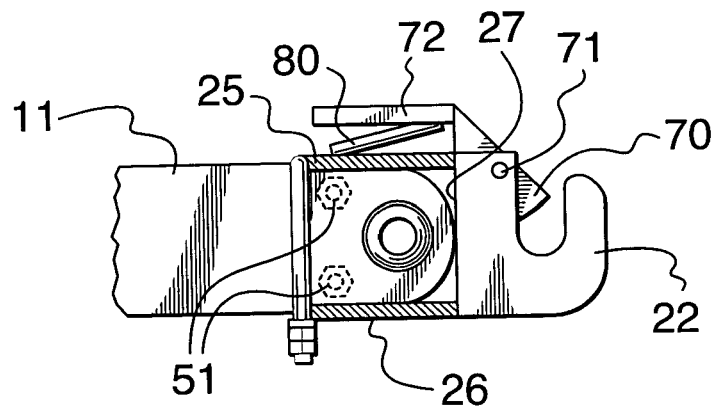
FIG. 7 is a side view of the adapter of FIG. 5 taken from the opposite side.

The hook 22 has an upwardly disposed jaw or bite and into which the draw pins 60 (or lugs) of an implement is inserted while coupling the implement to the hitch. A dog 70 is movably mounted on the rigid sleeve member selectively to respectively cover and uncover the throat of the jaw. In the embodiment illustrated in FIGS. 1–4 the locking dog 70 is reciprocally mounted while in the embodiment illustrated in FIGS. 5–7 the locking dog 70 is pivotally mounted. FIGS. 4, 6 and 7 illustrate the dog in a locking position and means is provided to retain or bias the dog to it's locking position. In FIGS. 6 and 7 there is illustrated a tension spring 80 that biases the locking dog to it's locking position. The locking dog that is pivotally mounted as at 71 has an arm 72 that is illustrated essentially parallel to the upper edge of the hitch lift arm and means such as an aperture 73 is provided for connecting thereto the end of a cable for remotely releasing the locking dog.

In the embodiment illustrated in FIGS. 1–4 a means for biasing such as a compression spring, not shown, biases the locking dog 70 to it's locking position shown in FIG. 4. A locking pin 75 is utilized to keep the locking dog in it's unlocked position shown in FIG. 3 and from which the spring biases the locking dock to it's lock position shown in FIG. 4.

From the forgoing it will be seen that the hitch arm adapter of the present invention is simply and yet ruggedly constructed. The hook portion is disposed in a plane between the side walls 23, 24 resulting in a compact and robust unit. The set screws 51 permits adjusting the position of the adapted and thereby allows aligning the hook for close fit and alignment with the attaching lugs (or pins) on the implement that is to be coupled to the tractor hitch. As previously pointed out the hitch lift arms diverge outwardly. This can make it difficult to connect the lift arm to the implement and/or result in a poor and loose connection.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A hitch lift arm adapter for a tractor hitch lift arm comprising;

a tubular member having a cavity therein adjacent a free outer end thereof, said tubular member comprising a spaced apart pair of opposite side walls, a top wall and a bottom wall, said tubular member including an opening into said cavity at one end and a hook at the other end, said tubular member cavity receiving therein a free outer end portion of the tractor hitch lift arm, each of said side walls of said tubular member including a hole therein, said holes being axially aligned for receiving a hitch arm connecting pin that extends through a hole in the hitch lift arm, and means for biasing cooperatively engaging each of said side walls and extending there through to engage opposite side faces of a hitch lift arm projecting into said cavity, a locking dog pivotally mounted on said tubular member including means for resiliently biasing said locking dog to said blocking state; and said locking dog pivoting at a point between said top wall and said bottom wall of said tubular member generally parallel to an upper edge of said hitch lift arm.

2. The hitch arm adapter as defined in claim 1, further comprising a locking dog movably mounted on said tubular member for selectively blocking entry into said hook.

3. The hitch lift arm adapter as defined in claim 1, wherein said hook is located between spaced apart planes defined by outer faces of said side walls.

4. The hitch arm adapter as defined in claim 1, wherein said locking dog is reciprocally mounted on said tubular member.

5. The hitch arm adapter as defined in claim 1, wherein said means resiliently biasing said locking dog to said blocking state is a tension spring.

6. A hitch lift arm adapter for a tractor hitch lift arm comprising:
   a tubular member having a cavity therein adjacent a free outer end thereof;
   said tubular member comprising a spaced apart pair of opposite side walls, a top wall and a bottom wall;
   said tubular member including an opening into said cavity at one end and a hook at the other end;
   said tubular member cavity receiving therein a free outer end portion of the tractor hitch lift arm;
   each of said side walls of said tubular member including a hole therein, said holes being axially aligned for receiving a hitch arm connecting pin extending through a corresponding hole in the hitch lift arm;
   means for biasing cooperatively engaging each of said side walls and extending there through to engage opposite side faces of a hitch lift arm projecting into said cavity, and
   wherein said means for biasing comprises at least one set screw.

7. The hitch lift arm adapter of claim 6, wherein said means for biasing comprises at least one set screw.

8. The hitch lift arm adapter as defined in claim 6, wherein said hook is located between spaced apart planes defined by outer faces of said side walls.

9. The hitch arm adapter as defined in claim 6, further comprising a locking dog movably mounted on said tubular member for selectively blocking entry into said hook.

10. The hitch arm adapter as defined in claim 9, including means resiliently biasing said locking dog to said blocking state.

11. The hitch arm adapter as defined in claim 10, wherein said locking dog is reciprocally mounted on said tubular member.

12. The hitch arm adapter as defined in claim 10 wherein said locking dog is pivotally mounted on said tubular member.

13. The hitch arm adapter as defined in claim 6, wherein said means resiliently biasing said locking dog to said blocking state is a tension spring.

14. A hitch lift arm adapter for a tractor hitch lift arm comprising;
    a tubular member having a cavity therein adjacent a free outer end thereof, said tubular member comprising a spaced apart pair of opposite side walls, a top wall and a bottom wall;
    said tubular member including an opening into said cavity at one end and a hook at the other end;
    said tubular member cavity receiving therein a free outer end portion of the tractor hitch lift arm;
    each of said side walls of said tubular member including a hole therein, said holes being axially aligned for receiving a hitch arm connecting pin that extends through a hole in the hitch lift arm;
    a locking dog pivotally mounted on said tubular member including means for resiliently biasing said locking dog to said blocking state; and
    said locking dog movably mounted located at a point of said tubular member generally parallel to an upper edge of said hitch lift arm.

15. The hitch lift arm adapter as defined in claim 14, further comprising means for biasing cooperatively engaging each of said side walls and extending there through to engage opposite side faces of a hitch lift arm projecting into said cavity.

16. The hitch lift arm adapter as defined in claim 15, wherein said means for biasing comprises at least one set screw.

17. The hitch lift arm adapter as defined in claim 14, wherein said hook is located between spaced apart planes defined by outer faces of said side walls.

18. The hitch arm adapter as defined in claim 14, wherein said locking dog movably mounted on said tubular member for selectively blocking entry into said hook is pivotally mounted on said tubular member.

19. The hitch arm adapter as defined in claim 14, wherein said means resiliently biasing said locking dog to said blocking state is a tension spring.

* * * * *